United States Patent
Manov et al.

(10) Patent No.: US 10,392,753 B2
(45) Date of Patent: Aug. 27, 2019

(54) RECORDING MEDIUM

(71) Applicant: Tagit-EAS Ltd., Netanya (IL)

(72) Inventors: Vladimir Manov, Hadera (IL); Mario Fuse, Kanagawa (JP)

(73) Assignee: TAGIT—EAS LTD., Netanya (IL)

(*) Notice: Subject to any disclaimer, the term of this patent is extended or adjusted under 35 U.S.C. 154(b) by 0 days.

(21) Appl. No.: 15/568,042

(22) PCT Filed: Apr. 18, 2016

(86) PCT No.: PCT/IL2016/050403
§ 371 (c)(1),
(2) Date: Oct. 20, 2017

(87) PCT Pub. No.: WO2016/170527
PCT Pub. Date: Oct. 27, 2016

(65) Prior Publication Data
US 2018/0142423 A1      May 24, 2018

Related U.S. Application Data

(60) Provisional application No. 62/149,845, filed on Apr. 20, 2015.

(51) Int. Cl.
| | | |
|---|---|---|
| *D21H 27/38* | (2006.01) |
| *D21H 15/02* | (2006.01) |
| *D21H 21/40* | (2006.01) |
| *D21H 21/48* | (2006.01) |
| *D21H 23/24* | (2006.01) |
| *D21H 23/26* | (2006.01) |
| *G08B 13/24* | (2006.01) |
| *G11B 5/64* | (2006.01) |
| *H01F 1/153* | (2006.01) |
| *D21H 19/00* | (2006.01) |
| *B41M 5/41* | (2006.01) |

(52) U.S. Cl.
CPC ............ *D21H 27/38* (2013.01); *D21H 15/02* (2013.01); *D21H 19/00* (2013.01); *D21H 21/40* (2013.01); *D21H 21/48* (2013.01); *D21H 23/24* (2013.01); *D21H 23/26* (2013.01); *G08B 13/2408* (2013.01); *G08B 13/2442* (2013.01); *G08B 13/2445* (2013.01); *G11B 5/64* (2013.01); *G11B 5/642* (2013.01); *H01F 1/153* (2013.01); *H01F 1/15391* (2013.01); *B41M 5/41* (2013.01); *G08B 13/24* (2013.01)

(58) Field of Classification Search
USPC ......................................................... 162/158
See application file for complete search history.

(56) References Cited

U.S. PATENT DOCUMENTS

| | | | |
|---|---|---|---|
| 5,414,410 A | 5/1995 | Davies et al. |
| 6,441,737 B1 | 8/2002 | Antonenco et al. |
| 6,836,216 B2 | 12/2004 | Manov et al. |
| 7,301,324 B2 | 11/2007 | Yamaguchi et al. |
| 8,978,415 B2 | 3/2015 | Adar et al. |
| 2003/0085809 A1 | 5/2003 | Antonenco |
| 2007/0243403 A1 | 10/2007 | Matsuda et al. |
| 2008/0013212 A1 | 1/2008 | Fuse et al. |
| 2008/0018674 A1 | 1/2008 | Matsuda et al. |
| 2012/0138692 A1 | 6/2012 | Makida |

FOREIGN PATENT DOCUMENTS

| | | |
|---|---|---|
| CN | 1843766 A | 10/2006 |
| CN | 101054782 A | 10/2007 |
| CN | 101109913 | 1/2008 |
| EP | 2 518 737 | 10/2012 |
| JP | 2007-177332 | 7/2007 |
| JP | 2008-020579 | 1/2008 |
| JP | 4529420 | 8/2010 |
| JP | 4807065 | 11/2011 |
| JP | 3211543 | 7/2017 |
| KR | 20120060725 | 6/2012 |
| KR | 101341164 | 12/2013 |
| KR | 101738341 | 5/2017 |
| WO | 01/20568 | 3/2001 |
| WO | 2014/185686 | 11/2014 |

OTHER PUBLICATIONS

JP 2007 177332, Oda Yasunori et al., machine translation, Jul. 2007.*
Chinese Office Action and Search Report for Application No. 201680000726.2 dated Jan. 28, 2019 with English translation.

* cited by examiner

*Primary Examiner* — Mark Halpern
(74) *Attorney, Agent, or Firm* — Browdy and Neimark, PLLC

(57) ABSTRACT

A recording medium is provided, such as paper, secured by magnetic microwires. The recording medium comprises: a pulp structure formed by pulp fibers, said pulp structure carrying microwires having a metal core of a predetermined material composition, and an insulating layer coating on said metal core; and at least one coating layer on at least one side of said pulp structure. The pulp structure is a single-layer structure with the microwires fully embedded in said single layer, the microwires having cross-sectional dimensions approximately equal to cross-sectional dimensions of the pulp fibers.

17 Claims, 9 Drawing Sheets

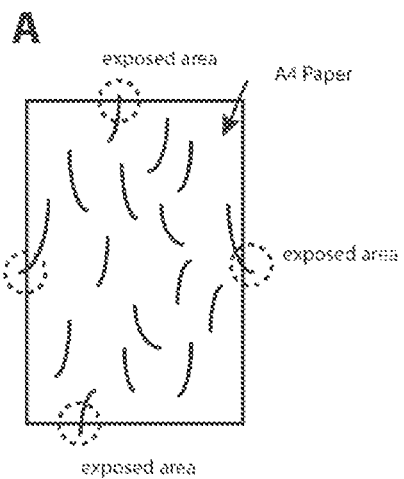
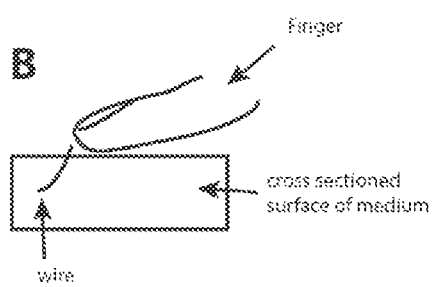
FIG. 4A     FIG. 4B
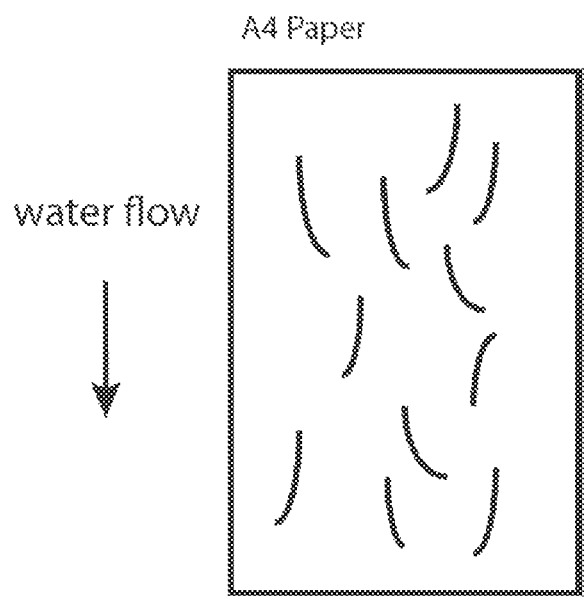
FIG. 5

FIG. 12

RECORDING MEDIUM

TECHNOLOGICAL FIELD

The invention relates to soft-magnetic microwires for use in a recording medium, which enables the presence of the recording medium to be detected in an EAS (Electronic Article Surveillance) system.

BACKGROUND

Heretofore, various kinds of paper containing soft-magnetic microwires (tag) have been studied for the prevention of forgery, security for highly confidential information, and other purposes.

The related-art technology for the paper mentioned is overviewed. U.S. Pat. No. 7,301,324 describes a recording medium detecting system including a magnetic field-generating unit that generates an alternating magnetic field in a predetermined particular region, a detecting unit provided close to the particular region for detecting a change in magnetic flux, and a recording medium, that is detectable by the detecting unit when placed in the particular region. The recording medium may be a two-layered or three-layered structure containing magnetic wires. In the two-layer structure, the magnetic wires are placed on one face of a substrate previously prepared and laminating another substrate hereon. In the three-layered structure a single-layered substrate (or wet paper) containing dispersed wires is sandwiched between two substrates (or wet paper) containing no wires. According to this technique, a plurality (eighteen) of 25 mm-long magnetic wires are dispersed uniformly over a whole sheet of wet paper. The wire has a diameter of 30 μm and a coercive force of less than 70 A/m.

Further, WO14185686 and KR101341164 describe a recording medium for security, including a detection base layer containing a material for detection and having a printable base integrated with the material for detection; and a shielding layer formed on both sides of the detection base layer so as to shield the material for detection. Here, the material for detection can be a soft magnetic material having a residual magnetic flux density of 0.1 T or more, a coercive force of 1 to 50 A/m and a magnetic permeability of 500 to 100,000H/m, when the frequency is 10 kHz.

GENERAL DESCRIPTION

There is a need in the art for a novel recording medium utilizing soft magnetic microwires for use in EAS systems. The term "recording medium" used herein refers to a structure/substrate to be printed on (e.g. a sheet of paper) by any suitable printing process such ink-jet printing, digital printing, etc.

For the EAS detection of an object carrying magnetic wires, the number and the distribution of the magnetic wires are important factors to provide sufficiently strong detection signals. Considering the use of magnetic wires to protect a recording medium, in order to enable better printing on the recording medium, the number and the distribution of microwires are important factors to provide a flat surface of the recording medium to be printed thereon. Furthermore, the number and the distribution of microwires in are closely connected with the medium (paper) production process.

The present invention is aimed at providing a security recording medium enabling successful detection by commercially available EM (Electromagnetic) gate systems. More specifically, the present invention is aimed at providing a security paper (exemplifying a recording medium) and is therefore described below with respect to this specific application.

Thus, according to one aspect of the invention, it provides a recording medium, comprising: a pulp structure formed by pulp fibers, said pulp structure carrying glass-coated microwires; at least one coating layer on at least one side of said pulp structure; wherein said pulp structure is a single-layer structure with said glass-coated microwires fully embedded in said single layer, the microwires having cross-sectional dimensions approximately equal to cross-sectional dimensions of the pulp fibers.

The microwire is configured as a soft-magnetic element, having a metal core of a predetermined material composition, and an insulating (e.g. glass) coating on said metal core. The magnetic microwire has a magnetic coercive force of 60 A/m or less (even preferably less than 20 A/m, or even less than 15 A/m), and has a large Barkhausen jump (discontinuity). The material composition of the metal core has nearly zero or negative magnetostriction.

Preferably, the material composition of the metal core is Co—Fe—Si—B—Cr alloy. Preferably, the Co—Fe—Si—B—Cr alloy contains 67.7% Co, 4.3% Fe, 11% Si, 14% B, and 3% Cr by atomic percentage.

Preferably, the length of microwire does not exceed or even preferably is less than 10 mm, being preferably 4-7.5 mm. The diameter of metal core is preferably in a range of 5-15 μm. The thickness of insulating coating preferably does not exceed and even preferably is less than 3 μm, is preferably in a range of 1-1.5 μm.

The microwires with the above dimensions can be properly distributed over the entire pulp layer (entire recording medium), i.e. uniformly distributed within a plane defined by the pulp layer being entirely embedded thereinside (i.e. without projecting from or exposed to the outside of the pulp layer). Also, the above microwires provide for proper orientation thereof, i.e. quazi-random orientation with respect to the longitudinal axis of the recording medium. Such distribution and orientation of the microwires of given dimensions allow for increasing the density of microwires in the pulp layer. These features provides for improving of the detectability of the microwires.

For example, the microwires fully embedded in the single-layer pulp structure are arranged with a density of microwires higher than 1.0 per square centimeter, or higher than 2.0 per square centimeter, or even higher than 3.0 per square centimeter.

As indicated above, the microwires fully embedded in said single-layer pulp structure are arranged with quazi-random orientation. Preferably, they are arranged with about 10 degrees variation of an angle of orientation of the microwires (their longitudinal axis).

The recording medium may be a paper configured for printing data thereon.

According to another broad aspect of the invention, it provides a soft-magnetic microwire having a metal core of a predetermined material composition, and an insulating coating on said metal core, wherein the metal core is Co—Fe—Si—B—Cr alloy having a magnetic coercive force less than 60 A/m, a large Barkhausen jump, and nearly zero or negative magnetostriction.

Preferably, the length of microwire does not exceed, or even preferably is less than 10 mm, being preferably 4-7.5 mm. The diameter of metal core is preferably in a range of 5-15 μm. The thickness of insulating coating preferably does not exceed and even preferably is less than 3 μm, is preferably in a range of 1-1.5 μm.

According to yet another aspect of the invention, it provides a method of manufacturing the above-described paper serving as recording medium, the method comprising:

proving a plurality of microwires, each microwire having a metal core of a predetermined material composition, and a glass coating on said metal core, wherein a diameter of the metal core substantially does not exceed 15 μm and a thickness of the glass coating substantially does not exceed 3 μm, and the material composition of the metal core is a soft-magnetic amorphous metal alloy with large Barkhausen effect, a magnetic coercive force of less than 20 A/m, and nearly zero or negative magnetostriction;

preparing a paper web on top of a fiber mesh, and distributing the microwires in the paper web;

applying water reduction treatment to said paper web, causing a water flow through and out of the paper web, thereby dispersing the microwires and forming a single-layer pulp structure with the microwires fully embedded therein such that the microwires are arranged with substantially uniform distribution within the pulp layer, and quazi-random orientation with about 10 degrees variation of an angle of orientation of the microwires.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 4A and 4B show schematically a plan view and a cross-section view, respectively, of an A4-sized paper produced by the prior art technique;

FIGS. 5 and 6 illustrate microwires' distribution of microwire used in the known recording medium (FIG. 5) and in the recording medium of present invention (FIG. 6).

FIGS. 8 to 12 exemplify detection of the microwires in the recording medium of the invention, where FIG. 8 shows the received signal waveform, related to current waveform in the transmitting coil (oscillating magnetic field), FIG. 9 shows partitioned gate space divided into a matrix of nine cells from 1_1 to 3_3, FIG. 10 shows classification of the orientations of the paper passing through the gate, FIG. 11 shows the practical positions which are most frequently-used positions, FIG. 12 shows the results of the detection test for these practical positions;

DETAILED DESCRIPTION OF EMBODIMENTS

As described above, the present invention provides a novel configuration of a recording medium (paper) secured by an arrangement (tag) of magnetic microwires, as well as the microwire structure, and a method of mass production of such recording medium.

Figure 1:
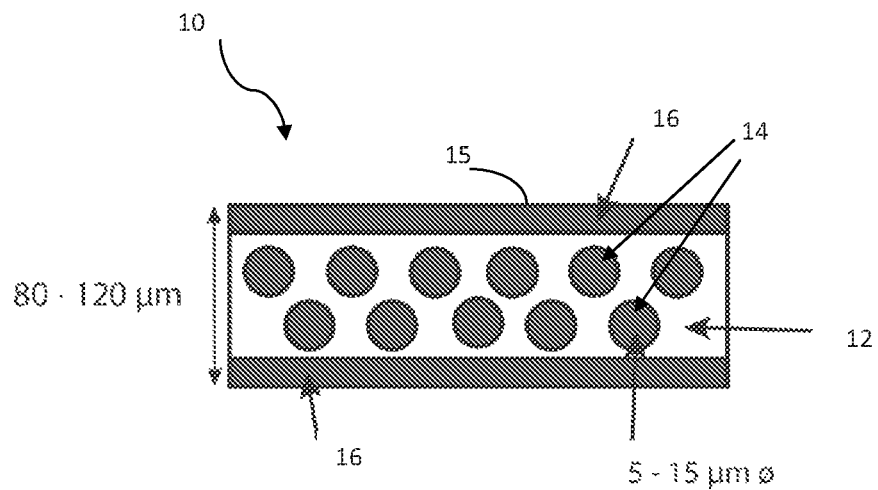
FIG. 1 schematically illustrates a cross-sectional view of a recording medium configured according to the principles of the invention.

Referring to FIG. 1, there is schematically illustrated a cross-section of a recording medium 10 configured according to the principles of the invention. The recording medium includes a single pulp layer (constituting an active layer or a securing layer) 12 carrying an arrangement of microwires 14, embedded inside the layer 12, and at least one protective layer 16 coating the active layer 12 at least at one side thereof. As shown in the specific not limiting example of FIG. 1, the coatings 16 are provided at both sides of the pulp layer 12. The microwires 14 are successfully distributed within the entire active layer 12 (over entire recording medium 10). As also shown in the figure, the microwires 14 are located inside the pulp layer 12 and may even be overlapping, i.e. arranged in more than one rows one above the other.

The recording medium 10 may be used for electro-photographic printing. Electro-photographic printing is completed by fusing a toner image on a surface 15 of the recoding medium by a rubber roll. Therefore, the printing surface 15 of the recording medium should preferably be sufficiently smooth; otherwise, i.e. if the microwires partially project from the printing surface, this will damage a surface of fuser roll. Thus, the microwires 14 should preferably be fully embedded in the pulp layer 12.

As further shown in FIG. 1, the microwires 14 are of about 5-15 μm diameter (generally, cross-sectional dimension), and the thickness of the entire recording medium 10 (single-layer active structure 12 and double-sided coating 16) is about 80-120 μm. The microwires are preferably glass-coated soft-magnetic microwires. The configuration of the microwire 14 of the invention and its fabrication will be described more specifically further below.

Figure 2A:
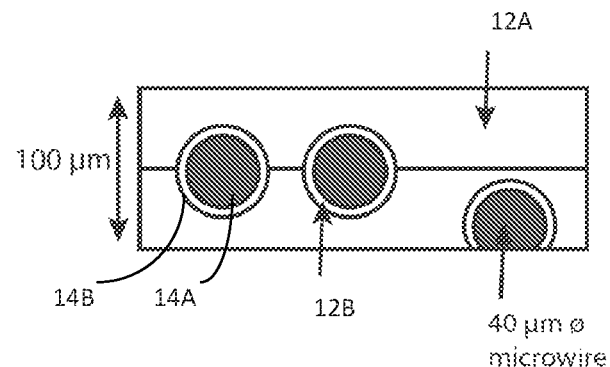
FIGS. 2A and 2B schematically illustrate two examples of the known structures of a recording medium utilizing magnetic wires for security purposes, where a two-layer pulp structure is used.
Figure 2B:
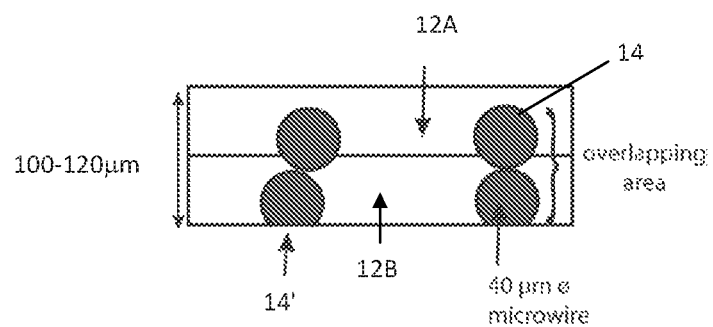

Referring to FIGS. 2A and 2B, two examples of the known structures of the recording medium of kind specified (i.e. carrying magnetic wires for security purposes) are shown, for comparison. To facilitate understanding, similar reference numbers are used for identifying the functionally common components in the recording 10 of the invention and known structures of FIGS. 2A and 2B.

In the structure of FIG. 2A, an "active" part of the recording medium (i.e. that holds the microwires therein-side) is formed by two pulp layers 12A are 12B. This practically makes the active part (pulp structure) of recording medium relatively thick (100 μm to 120 μm) to prevent the microwires from being exposed.

Such thicker medium unavoidably causes defusing due to an increase of heat mass because the pulp layer mostly contributes to the heat mass. Further, in the area/region where the microwires are exposed, the toner is hardly fused because the melted toner fails to diffuse between the pulp fibers. Also, in the structure of FIG. 2A, the microwires are glass coated wires, i.e. composed of magnetic core 14A and glass coating 14B. With this technique of such thick glass-coated microwires carried by a two-layer pulp structure, it is often the case that some of the microwires are only partially embedded and thus are partially projecting from the pulp structure, i.e. are exposed microwires.

In the configuration of FIG. 2B, similar to the structure of FIG. 2A, the "active" part of the recording medium holding the microwires is formed by two stacked layers 12A and 12B and the microwires located in these layers overlap. Some of the wires ("upper" wire) 14 are embedded within the pulp layers 12A-12B, while some other wires 14' ("lower" wires) are only partially embedded and thus exposed to the medium surface.

As indicated above, partial embedding of the microwires in the recording medium impedes and practically makes it impossible to obtain high-quality printing on the surface of the recoding medium.

As also shown in the figures, the recording medium 10 of the present invention (FIG. 1) uses the microwires 14 with smaller diameters, which facilitates full embedding (burring) of the microwires in the pulp layer and enables the recording medium thickness to be thin enough.

It should be understood that, generally, the simpler the structure of a recording medium (paper), the simpler and cheaper the paper fabrication is.

To make two-layer structure of an active part of the recording medium of the kind described above, a lower pulp layer (12B) is first prepared, then microwires are dispersed on it, and covered by an upper pulp layer (12A). Such process is described for example in JP4529420.

Further, the known recording mediums described above utilize microwires with larger diameters (about 40 µm versus 5-15 µm in the medium of the present invention). Each such larger-diameter piece of microwire is relatively heavy, and accordingly dispersion is difficult to proceed. Most of such relatively heavy microwires are sunk at the bottom of a wire-dispersion tank. The yield of the microwire inclusion into the medium is very low. Furthermore, longer microwires tangle in a wire-dispersion tank, which makes the dispersion difficult. Due to relatively large mass of microwires, the wire is buried at the lower part of lower pulp layer. Sometimes, some of microwires are exposed at the surface of medium after size press.

The above-described recording medium 10 of the invention shown in FIG. 1 utilizes shorter and thinner microwires 14 which enables uniform dispersion and complete embedding thereof within one pulp layer 12 and complete coverage by a protective coating 16. This enables the recording medium 10 of the invention to be more reliable for electro-photographic printing and higher protection for the prevention of forgery, security for highly confidential information.

The improvement of security is in that it is harder to see the microwires, i.e. microwires are practically not exposed to viewer at all. This means people are less likely to pull and/or the microwires out from the medium.

The following is the description of the possible configuration of the soft-magnetic microwire 14 of the invention. The soft-magnetic microwire 14 of an exemplary embodiment of the invention for use in a recording medium is capable of emitting large Barkhausen signals, which are caused by magnetization reversal, detectable with an EAS detector (typically, incorporated in a gate assembly). The microwire structure includes a soft-magnetic metal core coated with an insulating material, like a glass.

Glass coated microwires with amorphous metal cores have been developed and are described disclosed with a U.S. Pat. No. 6,441,737, incorporated herein by reference. The inventor of the present application is a co-inventor in U.S. Pat. No. 6,441,737. The material for the metal core is a cobalt-base alloy. For example, Co—Fe—Si—B alloy (e.g., containing 77.5% Co, 4.5% Fe, 12% Si, and 6% B by atomic percentage), Co—Fe—Si—B—Cr alloy (e.g., containing 68.7% Co, 3.8% Fe, 12.3% Si, 11.4% B, and 3.8% Cr by atomic percentage), or Co—Fe—Si—B—Cr—Mo alloy (e.g., containing 68.6% Co, 4.2% Fe, 12.6% Si, 11% B, 3.52% Cr and 0.08% Mo by atomic percentage) may be used.

As described below, it is desired that the soft-magnetic metal core has nearly zero or negative magnetostriction. The inventors of the present invention have found that, for the purposes of paper-like recording medium production, if the metal core in soft-magnetic microwires has positive magnetostriction, the large Barkhausen signal will be reduced or at worst diminished by the mechanical stress induced by the paper production process. The stress is typically applied after the paper production. For example, the pulp fiber elongates due to moisture and shrinks due to drying. The microwires are under such a stress in the pulp layer. On the other hand, when the soft-magnetic metal core has nearly zero or negative magnetostriction, the large Barkhausen signal will be more stable under stress applied on the microwires.

By controlling the alloy component, nearly zero or negative magnetostriction can be achieved. For example, while Co—Fe—Si—B—Cr alloy containing 67% Co, 5% Fe, 11% Si, 14% B, and 3% Cr by atomic percentage shows positive magnetostriction, Co—Fe—Si—B—Cr alloy containing 67.7% Co, 4.3% Fe, 11% Si, 14% B, and 3% Cr by atomic percentage shows nearly zero magnetostriction.

The diameter of the metal core in microwires of the current invention, which is especially useful for security paper, can be in a range of 5-15 µm. The thickness of insulating material (e.g. glass) substantially does not exceed and is preferably less than 2 µm, preferably about 1.5 µm. This is because thicker (more than 3 µm thick) glass coating is practically fragile to mechanical stress applied during paper production and also paper handling in the printing and/or copying machine like an electro-photographic printer. When glass is broken in the paper production machine and/or the printing machine, glass particles contaminate inside the parts of the machine, which may increase machine maintenance cost due to the shortened cleaning cycle. The present invention provides for using thinner glass coating which makes the microwire more flexible, and thus preventing the glass breaking effects.

The glass-coated microwire may be fabricated using the continuous Taylor-Ulitovsky method, which is disclosed in U.S. Pat. No. 8,978,415, and then cut into pieces with the lengths of about 10 mm or less, preferably 4 mm to 7.5 mm.

The following is the description of an example of the manufacturing process for manufacturing the recording medium of the present invention.

Figure 3:
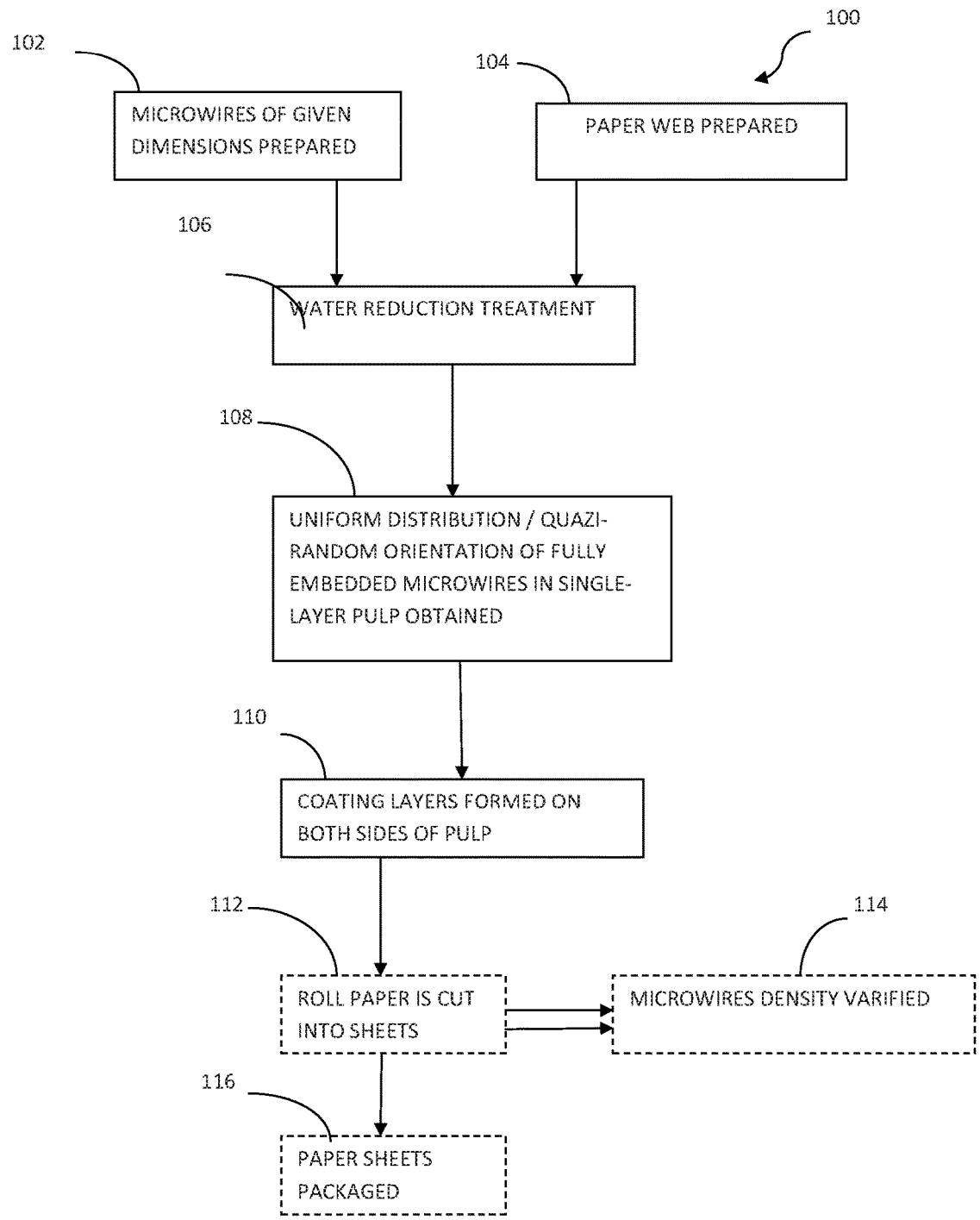
FIG. 3 illustrates schematically the main steps in the manufacture of security paper of the invention.

The manufacturing process utilizes well-known paper making techniques used for paper production for making graphic paper (i. e., paper suitable for office and printing) today. The main stages of such process are known per se and do not form part of the invention, and therefore need not be specifically described. FIG. 3 illustrates a flow chart 100 of the main steps/stages in the process of manufacturing the security paper, as follows:

The microwires of desired dimensions (metal core diameter and length) are prepared using the above-mentioned Taylor-Ulitovsky continuous method and cutting into pieces (step 102). The paper web is separately prepared (step 104) using the known technique. Briefly, pulpwood arrives at a paper mill in the form of very thick sheets and recovered paper normally arrives in the form of large, compressed bales. Both these materials have to be broken down so that the individual fibers they contain are completely separated from each other. This process is performed in large vessels, known as 'pulpers', where the raw materials are diluted with water and then subjected to violent mechanical action using steel rotor blades. The resulting papermaking stock is then passed to holding tanks. During this preliminary stage, auxiliary chemicals and additives may be added. The auxiliary chemicals are usually combined with the fibrous raw materials and can be sizing agents, which reduce ink and water penetration, and process anti-foaming agents. The stock is then pumped through various types of mechanical cleaning equipment to the paper machine. On the paper machine, more water is added to produce a fiber suspension and the resulting mixture is passed into a head-box which squirts it through a thin, horizontal slit across the full machine width on to a moving, endless wire mesh.

Then, a water reduction treatment is applied (sheet formation process), during which the microwires are dispersed in the pulp layer (step 106). During the water removal, the fibers start to spread and consolidate into a thin mat, forming a layer of paper on top of the wire mesh. This web of wet paper is then lifted from the wire mesh and squeezed between a series of presses where its water content is lowered to about 50%. It then passes around a series of cast-iron cylinders, heated to temperatures in excess of 100° C., where drying takes place. Here, the water content is lowered to its final level (to between 5% and 8%). Throughout its passage from the wire mesh to the drying operation, the paper web is supported by various types of endless fabric belts moving at the same speed. After drying, some papers may also undergo surface treatments, e.g. sizing and calendaring—smoothing the surface of the paper by passing it between a series of rotating, polished, metal rollers to produce a glazed or glossy appearance. The paper may then be wound into a reel.

According to the invention, during the above water reduction treatment, the microwires (configured as described above) are distributed uniformly with proper orientation and density in the paper web (step 108). This will be described more specifically further below. The paper web provides a base which fixes the microwires on its smooth and soft surface. When it is size pressed, the microwires are buried (fully embedded) inside the pulp fibers.

Then, coating is applied on both sides of the paper layer (pulp layer) containing microwires (step 110). The pulp layer, when contains microwires embedded therein, presents an active securing layer detectable by a magnetic reader/detector (gate).

The coating has several functions, as follows. It prevents the microwires from being exposed at the surface, from leaving the pulp layer (escaping therefrom), from being identified easily. Also, the coating enables toner or ink to diffuse easily inside during fusing or drying, and enables to provide friction force for paper handling in a copy machine and printer.

Thus, the coating materials are properly selected to provide the above functions. The following is the description of an example of the candidates for coating material composition is described below.

Coating takes place on size press after the paper web is created and partially dried. A coating bath contains mixture of natural binder (starch, PVOH, carboxymethylcellulose) and synthetic latex (styrenebutadien, styreneacrylic, vinylacetate). The ratio of these two compounds may be about (approximately) 10 to 80 parts of natural binder (depending on binder used) and approximately 40 to 70 parts of synthetic latex (expressed as dry weight). The coating bath may also contain other materials, like mineral filler, antistatic agent, whitening agent, dye and other functional chemicals usually used for surface treatment of paper. Total solids content of the coating bath is in a range of about 4 to 20%. Pickup of solids on size press is about 1.5 to 4 gsm per one side of paper.

A final form is paper roll which winds a paper sheet composed of one pulp layer (12 in FIG. 1) with the microwires 14 dispersed and a coating layer 16. Paper roll may then is cut by the blade into each sheet of the record medium (step 112). The density of the microwires in the paper sheet may be verified (step 114); and the paper sheets may be properly packaged (step 116).

For comparison, let us consider the prior art techniques of the kind specified. In the prior art techniques, the blade is deteriorated fast because of thick metal core and thick glass coating of the wires. A resulting short life of blade make the paper production process more expensive, and causes the cutting failure which left the microwires out from the surface of cut cross-section. This is illustrated schematically in FIGS. 4A and 4B which show a plan view and a cross-section view, respectively, of an A4-sized paper produced by the prior art technique. As shown, some microwires are exposed to the edge surface (marked by dotted circle) caused by cutting failure. In some cases, some of them stick out from the edge. The cutting failure caused the microwire at the edge of paper sheet to sting customer's finger in paper handling, as shown in FIG. 4B.

Turning back to FIG. 1, it is clearly shown that all the above problems are solved in the recording medium of the invention, since the microwires of the invention are thinner, due to thinner metal core and thinner glass coating used in the microwires of the present invention.

As indicated above, for the proper detection of the microwires embedded in the recording medium, such factors as number of microwires and their distribution in the recording medium. With regard to the number of microwires, it is evident that for a given paper size, the present invention provides for embedding a larger number of microwires since they are thinner than the known ones, thus, for a given thickness of a recording medium, providing a stronger detection signal. The technique of the present invention also provides distribution of the microwires improving the security performance.

Figure 6:
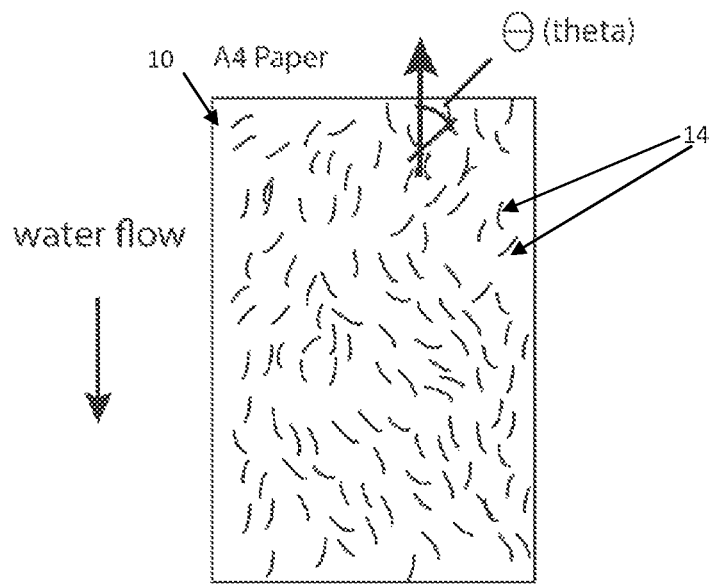

In this connection, reference is made to FIGS. 5 and 6 comparing the distribution of the microwire used in the known technique (FIG. 5) and that of the present invention (FIG. 6). As shown, the A4-sized paper, in case of the present invention (FIG. 6) contains much higher number of microwires with more uniform distribution of the microwires, and more random orientation defined by the tilt angle (theta) with respect to x-axis (along the long side of A4 sheet), as compared with that of the prior art technique (FIG. 5).

In this connection, the following should be noted. The microwires are actually dispersed by water flow. In the conventional techniques, most of the microwires, being relatively large and heavy become almost homogeneously oriented. In some cases they are oriented approximately along the X-axis, being that of the water flow direction, or along the axis tilted against the water flow axis but such that the central value is just shifted and the variation in tilt angle is almost the same (i.e. the microwires are almost equally tilted resulting in substantially homogeneous orientation).

The inventors have found that from the security point of view, the directionality of detecting the existence of the microwire should be reduced. This is because large Barkhausen jump happens when the effective magnetic field coincides with the wire direction. Hence, if the directionality is high (homogeneous orientation of microwires), the detection is hardly done for some zones of EAS gates; and if the randomness in the wire orientation (i.e. non-directionality) is high, large Barkhausen jump happens for any zone of EAS gate.

Therefore, the use of the above-described lighter-mass microwires of the present invention provides for increasing the randomness in the microwires orientation (i.e. orientation of their long axes). This results in the higher security performances of the recording medium carrying such microwires. Moreover, the randomness in the microwires orientation also provides for increasing the number of microwires that can be embedded in the paper.

Thus, the present invention provides the microwires of lighter mass (caused by smaller core diameters and shorter lengths), which provides for better dispersion of microwires in water, which results in both, uniform distribution of the microwires and randomness (or quazi-randomness) of their orientation (while with narrower distribution of the tilt angle). The microwire of the present invention, being of about 5-10 µm diameter and about 10 mm length (compared to the prior art one of 30 µm diameter and 25 mm length), has a mass of one order of magnitude smaller than that of the prior art.

The present invention thus advantageously provides improved microwires dispersion which leads to an increase of the number of uniformly distributed and randomly oriented microwires in the recording medium, which causes large Barkhausen signals to be higher. In the case of A4 sheet, more than 1000 pieces of magnetic wires, which equals to the density of more than 1.6 per square centimeter, provide sufficient detection in a commercial EAS electromagnetic gate. If the number of microwires is less than 700, which equals to the density of less than 1.1 per square centimeter, the inventors found that detection failed in some zones of the gate in several detection tests. For a paper sheet larger than A4-size, the density of more than 1.6 per square centimeter should preferably be kept to provide sufficient detection in a commercial EAS electromagnetic gate.

The following are some practical examples for the fabrication of paper with microwires and detection of microwires.

Fabrication of Paper with Microwires

The inventors have manufactured the A4-sized (210 mm×297 mm) test paper samples with the above-described microwires (previously prepared by the above-described method). The samples have the same structure of the paper shown in FIG. 1, namely including one pulp layer (12 in FIG. 1) with the glass-coated microwires embedded in the pulp layer and coated with the coating layer 16 on both sides of the pulp layer 12. The samples include different numbers of microwires, 700, 850, 1100, 1300, and 2000 microwires. The density of microwire in unit of per square centimeter varies from 1.1 to 3.2. The core diameters of microwires are chosen to be 7.5 µm, 10 µm and 15 µm, the lengths of microwires are chosen to 5, 7.5 and 10 mm. The glass-coating thickness is 0.5 µm to 2 µm. The coercive force varied from 5 to 15 A/m. In all the examples, with the microwires of diameter less than 20 µm, the microwire is substantially of (comparable with) the dimensions of pulp layer fiber.

The characteristics of 45 types of the test paper are summarized in the following Table 1:

TABLE 1

| Sample No. | Diameter of Core D (micron) | Length of Wire L (mm) | Number of pieces N(pieces) | Density of pieces (per square cm) |
|---|---|---|---|---|
| 1 | 15 | 10 | 2000 | 3.2 |
| 2 | 15 | 10 | 1300 | 2.1 |
| 3 | 15 | 10 | 1100 | 1.8 |
| 4 | 15 | 10 | 850 | 1.4 |
| 5 | 15 | 10 | 700 | 1.1 |
| 6 | 15 | 7.5 | 2000 | 3.2 |
| 7 | 15 | 7.5 | 1300 | 2.1 |
| 8 | 15 | 7.5 | 1100 | 1.8 |
| 9 | 15 | 7.5 | 850 | 1.4 |
| 10 | 15 | 7.5 | 700 | 1.1 |
| 11 | 15 | 5 | 2000 | 3.2 |
| 12 | 15 | 5 | 1300 | 2.1 |
| 13 | 15 | 5 | 1100 | 1.8 |
| 14 | 15 | 5 | 850 | 1.4 |
| 15 | 15 | 5 | 700 | 1.1 |
| 16 | 10 | 10 | 2000 | 3.2 |
| 17 | 10 | 10 | 1300 | 2.1 |
| 18 | 10 | 10 | 1100 | 1.8 |
| 19 | 10 | 10 | 850 | 1.4 |
| 20 | 10 | 10 | 700 | 1.1 |
| 21 | 10 | 7.5 | 2000 | 3.2 |
| 22 | 10 | 7.5 | 1300 | 2.1 |
| 23 | 10 | 7.5 | 1100 | 1.8 |
| 24 | 10 | 7.5 | 850 | 1.4 |
| 25 | 10 | 7.5 | 700 | 1.1 |
| 26 | 10 | 5 | 2000 | 3.2 |
| 27 | 10 | 5 | 1300 | 2.1 |
| 28 | 10 | 5 | 1100 | 1.8 |
| 29 | 10 | 5 | 850 | 1.4 |
| 30 | 10 | 5 | 700 | 1.1 |
| 31 | 5 | 10 | 2000 | 3.2 |
| 32 | 5 | 10 | 1300 | 2.1 |
| 33 | 5 | 10 | 1100 | 1.8 |
| 34 | 5 | 10 | 850 | 1.4 |
| 35 | 5 | 10 | 700 | 1.1 |
| 36 | 5 | 7.5 | 2000 | 3.2 |
| 37 | 5 | 7.5 | 1300 | 2.1 |
| 38 | 5 | 7.5 | 1100 | 1.8 |
| 39 | 5 | 7.5 | 850 | 1.4 |
| 40 | 5 | 7.5 | 700 | 1.1 |
| 41 | 5 | 5 | 2000 | 3.2 |
| 42 | 5 | 5 | 1300 | 2.1 |
| 43 | 5 | 5 | 1100 | 1.8 |
| 44 | 5 | 5 | 850 | 1.4 |
| 45 | 5 | 5 | 700 | 1.1 |

Figure 7:
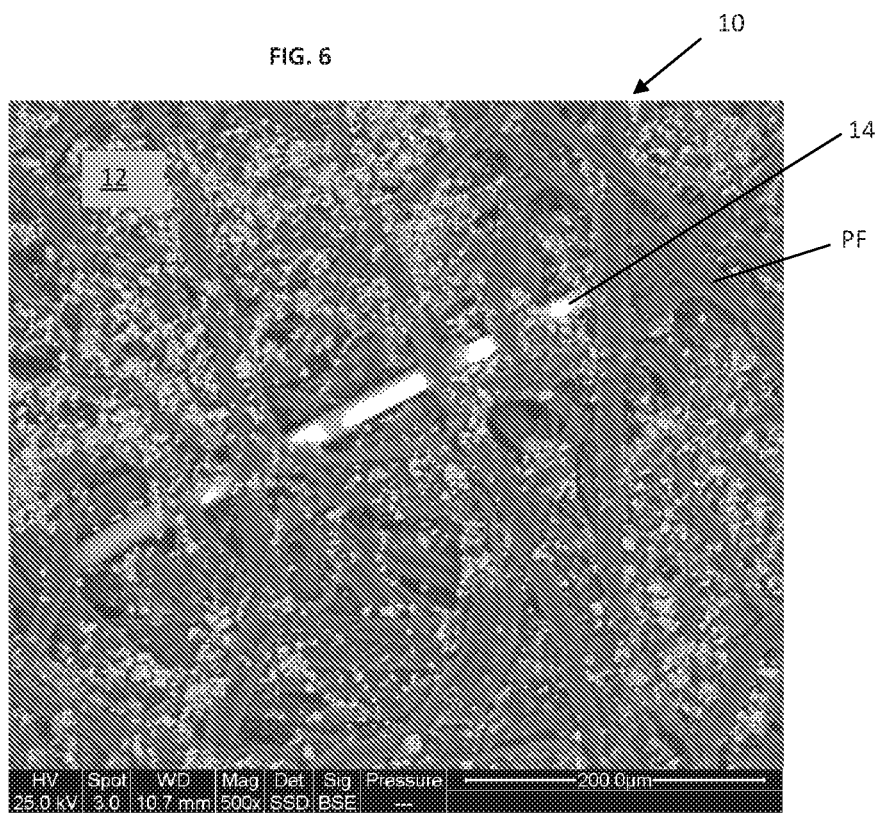
FIG. 7 illustrates a microphotograph of a portion of the surface of the paper with the microwires embedded in the pulp layer, according to the technique of the invention.

FIG. 7 shows a microphotograph of a portion of the surface of the paper with the microwires embedded in the pulp layer. The pulp layer is composed of pulp fibers entangled with each other. As shown in the figure, the microwire 14, embedded in the pulp layer 12, has almost the same dimension as the pulp fibers PF. The diameter of microwire 14 is less than 20 µm. The width of pulp fiber is typically about 20 µm or less. This configuration may make the microwires easily embedded into single pulp layer. Although not seen in FIG. 7, the distribution of microwires 14 was overall uniform in the entire area of A4 sized paper and the orientation of microwires was random or quasi-random, similar to that illustrated schematically in FIG. 6, that is, angle of orientation (theta) changed in average from 45 degree to 90 degree. Under the paper mill machine speed of 45 to 65 m/min, the angle of orientation varied mainly from 55 degree to 75 degree. Also, the coating glass was not broken after the paper production process, which shows that thinner glass coating is effective to prevent contamination caused by broken glass powder.

Detection Test

The inventors ran the detection test using two types of a commercial EAS electromagnetic gate. One is Tagit EM (Electromagnetic) System, whose detection mechanism is disclosed in U.S. Pat. No. 6,836,216 assigned to the assignee of the present application and incorporated herein by reference. The configuration and operation of the Gate System (as well as any other suitable detection system) do not form part of the present invention, and therefore need not be described in details. Briefly, the Tagit EM System operates such that in the interrogation zone, an oscillating magnetic field is generated in orthogonal directions like ORTHOGONAL, FLAT, and FRONT direction. When the soft-magnetic material (used in the present invention) passes through the interrogation zone, it interacts with the oscillating magnetic field of the detection system and transmits large-Barkhousen signal to a receiving coil of the detection system.

Figure 8:
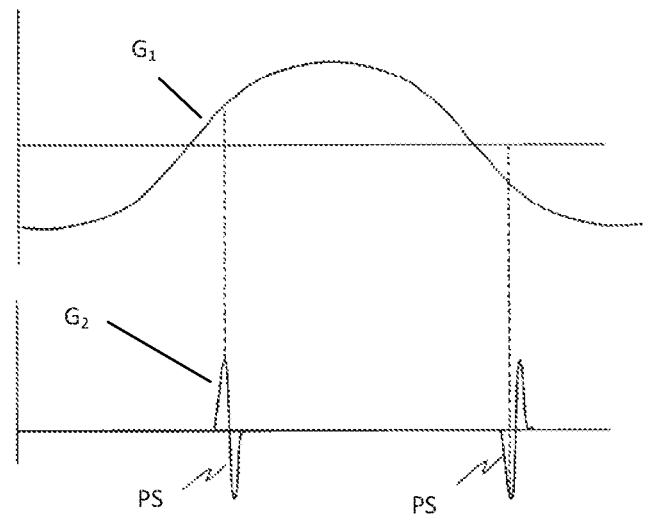

FIG. 8 shows the received signal waveform, related to current waveform in the transmitting coil (oscillating magnetic field). In the figure, the top graph $G_1$ corresponds to the oscillating magnetic field (which for simplicity is shown as sinusoidal, while may be of any conventional waveform) and the bottom graph $G_2$ corresponds to the microwires' response signal. The oscillating magnetic field (of the Gate System) applied to the soft-magnetic material (microwires) is over the threshold level, and the soft-magnetic material transmits the pulse signal PS as a result of magnetization reversal.

The other Gate System used in the detection test is Meto EM System, whose detection mechanism is disclosed in U.S. Pat. No. 5,414,410. Generally, in such Gate System, transmitting antennas generate magnetic fields of two or three different frequencies, and the nonlinear response of soft-magnetic marker results in intermodulation products of these frequencies that are detected by the signal processing unit. The magnetic markers are relatively small markers (0.7 mm width and 35 mm typical length). The test paper of Koreit has this type of the marker, so it is easily detected by Meto system.

In the detection tests, the same distance of 75 cm between the gate panels (as used in Tagit EM system) was used for both detection systems.

The paper samples used in the test are the above listed 45 types of paper (Table 1). These paper samples are fabricated by changing the average number of microwires embedded in the pulp layer. The numbers chosen are 2000, 1300, 1100, 850, and 700. The corresponding densities of microwires are 3.2, 2.1, 1.8, 1.4, 1.1 in unit of per square centimeter, respectively. The diameter of soft-magnetic core varied from 7.5 µm to 15 µm, and the length of microwires varied from 5 mm to 10 mm. The thickness of glass coating was 0.5 µm to 2 µm. The magnetic coercive force was 5 to 15 A/m.

For reference, Koreit paper, which is commercially available, was used for the test. The Koreit paper has a two-layered structure, with 2 or 3 amorphous soft magnetic strips of amorphous soft-magnetic metal located between layers, which can be easily detected by Meto EM system. The width of slip is 0.7 mm, the length is 35 mm, and the magnetic coercive force is 5 to 30 A/m.

The test is aimed at checking the detection ability of the gate in the Tagit 2-antenna and Meto 2-antenna EM Systems for the paper being moved with a certain orientation through a certain cell inside the gate. Taking into account the practical use, the moving speed is about the walking speed of an individual.

Figure 9:
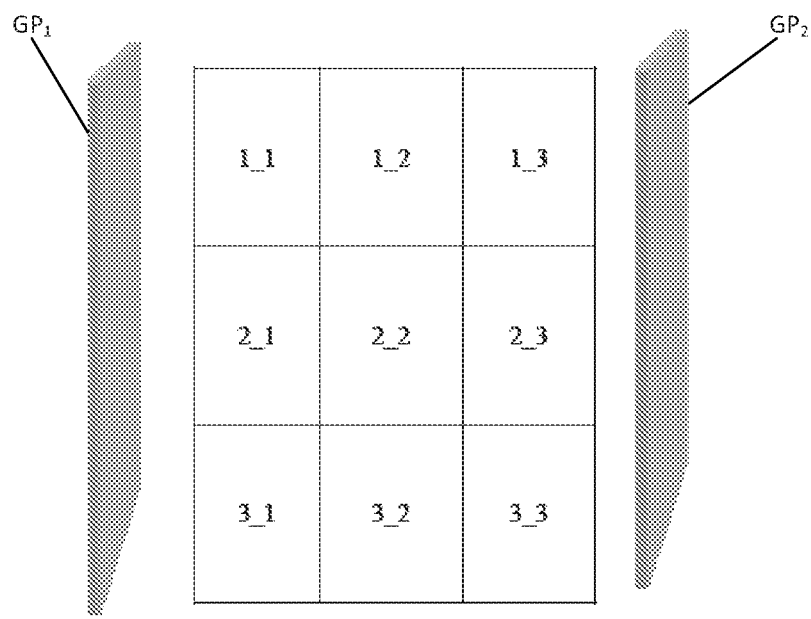
Figure 10:
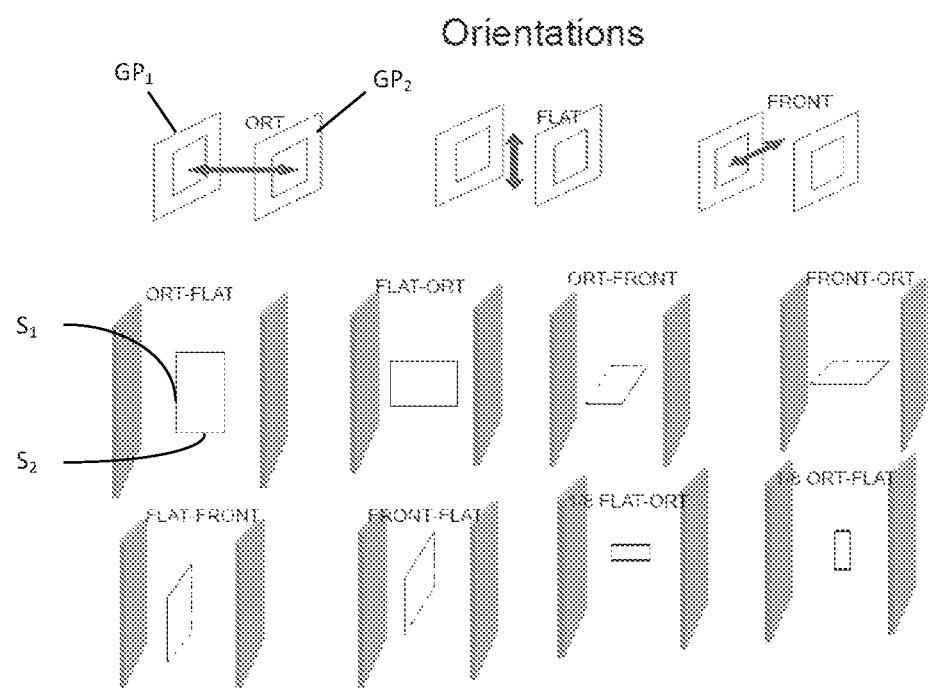

FIG. 9 shows that the space inside the gate (between the gate panels $GP_1$ and $GP_2$ is divided into a matrix of nine cells from 1_1 to 3_3. The aisle width is 75 cm. FIG. 10 shows classification of the orientations of the paper passing through the gate. The orthogonal coordination system is introduced. Six types of orientation are defined for the A4-sized paper.

The other two types of orientation are defined for ⅛-folded paper. The axes of ORT, FRONT and FLAT are defined. The paper orientation when the long side $S_1$ of the paper is parallel to ORT and the short side $S_2$ is parallel to FLAT is designated as ORT-FLAT. Thus, there are six orientations like ORT-FLAT, FLAT-ORT, ORT-FRONT, FRONT-ORT, FLAT-FRONT and FRONT-FLAT.

Figure 11:
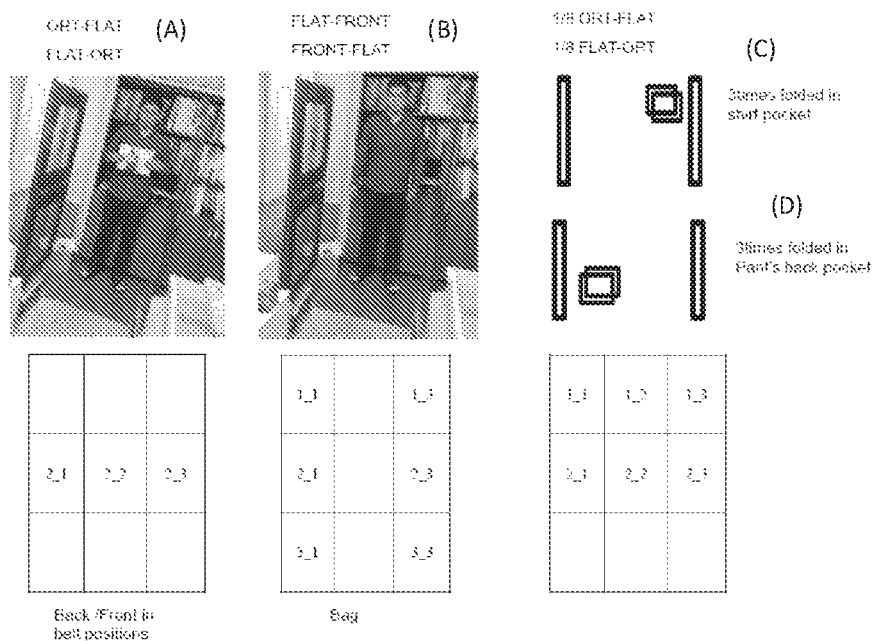

Before the test, the practical positions which are most frequently-used positions are defined, as shown in FIG. 11. In FIG. 11, the left-hand side (position (A)) corresponds to the back/front belt positions. The photo shows the situation when user holds the paper at his chest. The related cells are 2_1, 2_2, and 2_3. The related paper orientations are ORT-FLAT and FLAT-ORT. The center part (position (B)) corresponds to the bag position. The photo shows the situation of typical paper orientation when put in bag. The related cells are 1_1, 2_1, 3_3, 1_3, 2_3, and 3_3. The related orientations are FLAT-FRONT and FRONT-ORT. The right-hand side (position (C)) corresponds to the pocket position. The upper sketch shows the situation of putting the paper 3 times folded in shirt pocket. The lower sketch (position (D)) shows the situation of putting the paper 3 times folded in pant's pocket. The related cells are 1_1, 1_2, 1_3, 2_1, 2_2, and 2_3. The related orientations are ⅛ ORT-FLAT and ⅛ FLAT-ORT.

Figure 12:
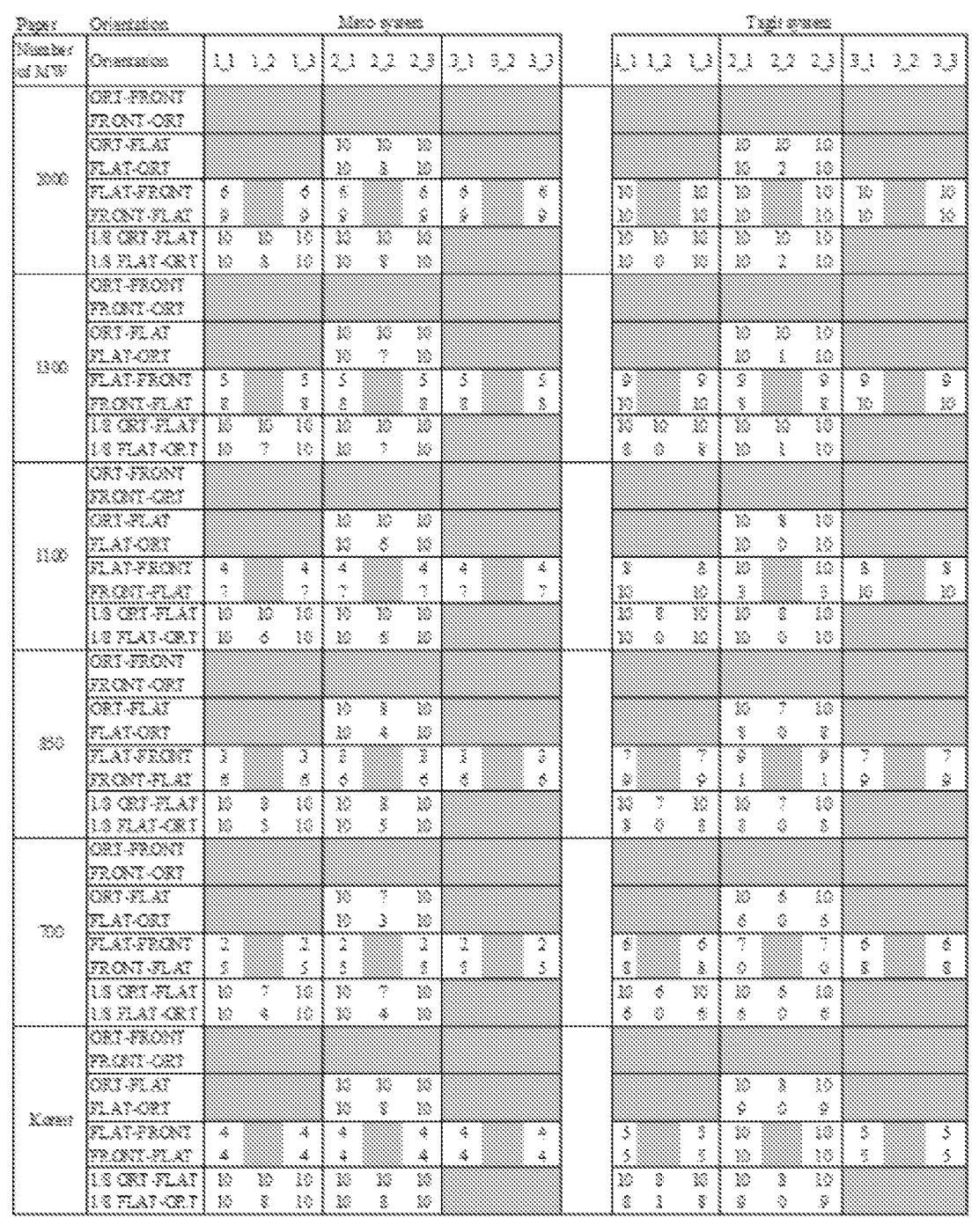

FIG. 12 shows the results of the detection test for the above practical positions. The tested papers are Tagit 2000, Tagit 1300, Tagit 1100, Tagit 850, Tagit 700, and Koreit. The used gates are Tagit 2-antenna EM system and Meto 2-antenna EM system. For each practical position, 10 attempts were carried out, there are 30 practical positions, and thus totally 300 attempts were carried out for each test paper. The attempt for each orientation is repeated ten times for each cell. In the figure, the non-practical positions, that were not tested are marked by grey.

Figure 13:
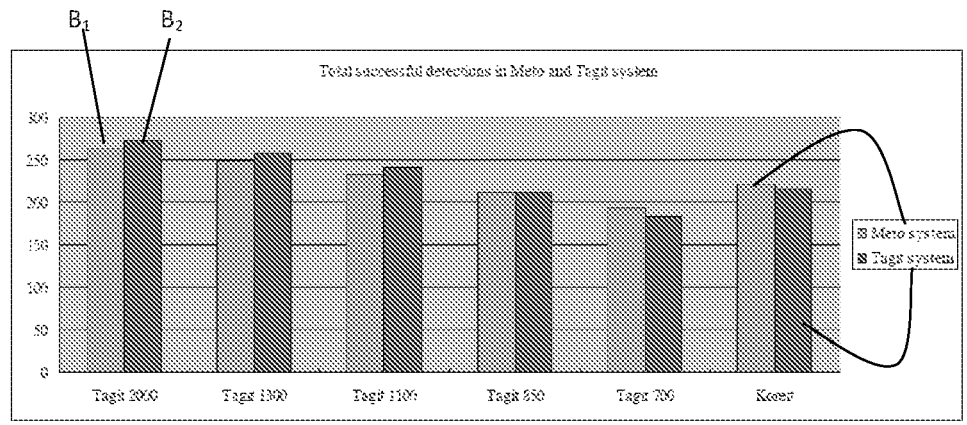
FIG. 13 shows the comparison of the detection ability for 6 types of test paper.

FIG. 13 shows the comparison of the detection ability (detectability) for 6 types of test paper. The test papers are samples 6 to 10, and Koreit paper. The diameter of metal core in the microwire is 15 µm and the length of microwire is 7.5 mm Two bars $B_1$ and $B_2$ are shown for each test paper. The left-hand bar $B_1$ shows the result for Meto system, and the right-hand bar $B_2$ shows the result for Tagit system.

As can be seen, detectability of the secured paper of the present invention (Tagit paper) configured as described above increases with an increase of the density of microwires. The Tagit 1100, whose density of microwires is about 1.8 per square centimeter, has better performance than the prior-art (Koreit paper). On the other hand, Tagit 700 and Tagit 850 paper samples are inferior in detection. A similar behavior was observed for other paper samples containing microwire sets with different diameters of metal core (10 µm, 5 µm) and different lengths of microwire (10 mm, 7.5 mm).

Figure 14:
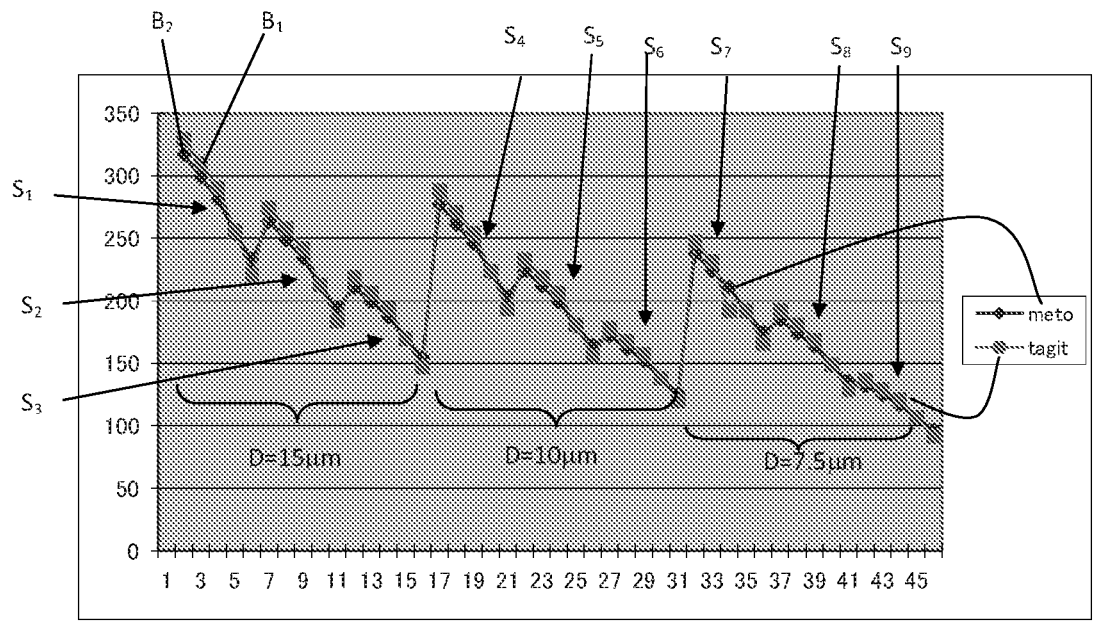
FIG. 14 compares the detectability for 45 paper samples with microwires of different dimensions (diameters of metal core and lengths of microwire) and different densities of microwires.

FIG. 14 compares the detectability for the above listed 45 paper samples with different diameters (D) of metal core (15 µm, 10 µm, and 5 µm) and different lengths (L) of microwire (10 mm, 7.5 mm, and 5 mm), and different densities of microwires (3.2, 2.1, 1.8, 1.4, and 1.1). The horizontal axis indicates the sample number in Table 1 above. The vertical axis indicates the total number of successful detections, which corresponds (is equivalent) to the detectability. Square-plot $B_2$ indicates the result for Tagit system, and diamond plot $B_1$ indicates the result for Meto system. Nine sets $S_1$-$S_9$ are shown, each for five plots for different 5 samples, where sets $S_1$-$S_3$ correspond to microwires having diameter D=15 µm and lengths 10 mm, 7.5 mm, and 5 mm respectively; sets $S_4$-$S_6$ correspond to microwires having diameter D=10 μm and lengths 10 mm, 7.5 mm, and 5 mm respectively; and sets $S_7$-$S_9$ correspond to microwires having diameter D=7.5 μm and lengths 10 mm, 7.5 mm, and 5 mm respectively. These graphs show that for the microwire dimensions (D,L)=(15,10), i.e. set $S_1$, the detectability decreases with a decrease of the density of microwires. A similar behavior was observed for the microwires (D,L)= (15,7.5), i.e. set $S_2$. From this set, along with a decrease of the length of wire, the detectability decreases. A similar behavior was observed for microwires (D,L)=(15,5.0), whose plots are indicated by the third five-plot set $S_3$. The fourth set $S_4$ of five plots correspond to microwires (D,L)= (10,10), which show that the detectability decreases with decrease of the diameter of the core metal. The effect of the decrease in the diameter D on the detectability is to parallel shift the polygonal line downwards. For example with L=15 mm, when the diameter D is decreased from 15 μm to 10 μm, the polygonal line from the first set of 5 plots shifts to the polygonal line from the fourth set of 5 plots with a slope kept constant.

Summarizing the results, the detectability decreases with a decrease of microwire diameter and length D, L and the density of microwires. For example, as shown in FIG. 14, to achieve the detectability of over 200, in the case of microwires of diameter D=15 μm, the length of microwire can be decreased to 5 mm, which makes the distribution of microwires more uniform due to lighter mass (as described above); in the case of microwires of diameter D=10 μm, the length of microwire can be decreased to 7.5 mm; and in the case of microwires of diameter D=5 μm, the length of microwire can be decreased to 10 mm. Therefore, for the same required detectability to be obtain, the invention provides for a freedom of choice in the diameter, length, and density of microwires, as well as infirmity in distribution and quazi-randomness in alignment/orientation (as a result of thinner and lighter microwires). This provides for optimizing the distribution (higher density, better uniformity, quazi-random orientation) of microwires of given dimensions, to thereby obtain higher detectability of microwires.

Print Test

The print test was performed for the test paper samples listed in Table 1 and Koreit paper. The used printers were an electro-photographic printer and an ink-jet printer. Printing was made on the both sides. The Tagit paper showed almost the same printing quality as Koreit paper. No curling was observed after optimization of the design of the coating layer.

From the above results, it is evident that the density of microwire should preferably be greater than 1.6 per square centimeter to achieve better detection as compared to the known technique. Furthermore, it is shown that the technique of the present invention provides high quality recording medium with single-layer pulp structure that can be fabricated by the conventional paper production process described before.

The invention claimed is:

1. A recording medium, comprising:
   a web structure formed by web fibers and carrying microwires having a metal core of a predetermined material composition comprising a soft-magnetic amorphous metal alloy capable of providing a response signal to an oscillating magnetic field, and an insulating layer coating on said metal core;
   at least one coating layer on at least one side of said web structure;
   wherein said web structure comprises a layer comprising the web fibers and the microwires which have the metal core of a cross-sectional dimension not exceeding 15 μm and length substantially not exceeding 10 mm and which are fully embedded in said layer being substantially uniformly distributed within a plane defined by said layer and arranged with a desirably high density that is higher than 1.0 per square centimeter in said layer for improving detectability of the response signals from the microwires when said recording medium is exposed to the oscillating magnetic field.

2. The recording medium according to claim 1, wherein said insulating layer is a glass coating.

3. The recording medium according to claim 2, wherein a thickness of the glass coating substantially does not exceed 3 μm.

4. The recording medium according to claim 3, wherein the thickness of the glass coating is in a range of 0.5-1.5 μm.

5. The recording medium according to claim 2, wherein the material composition of the metal core is the soft-magnetic amorphous metal alloy with a Barkhausen effect and a magnetic coercive force of less than 20 A/m providing the response signal to the oscillating magnetic field to which the recording medium is exposed.

6. The recording medium according to claim 5, wherein said material composition of the metal core has the magnetic coercive force in a range of 2-10 A/m.

7. The recording medium according to claim 5, wherein the material composition of the metal core has nearly zero or negative magnetostriction.

8. The recording medium according to claim 2, wherein the material composition of the metal core is Co—Fe—Si—B—Cr alloy.

9. The recording medium according to claim 8, wherein said Co—Fe—Si—B—Cr alloy contains 67.7% Co, 4.3% Fe, 11% Si, 14% B, and 3% Cr by atomic percentage.

10. The recording medium according to claim 1, wherein the microwires fully embedded in said player of the web structure are arranged with the density of the microwires higher than 2.0 per square centimeter.

11. The recording medium according to claim 1, wherein the microwires fully embedded in said player of the web structure are arranged with the density of the microwires higher than 3.0 per square centimeter.

12. The recording medium according to claim 1, wherein the microwires fully embedded in said player of the web structure are arranged with quazi-random orientation.

13. The recording medium of claim 12, where the microwires are arranged with the quazi-random orientation with about 10 degrees variation of an angle of orientation of the microwires.

14. The recording medium according to claim 1, being a paper configured for printing data thereon.

15. The recording medium of claim 14, manufactured by a method comprising:
   proving a plurality of microwires, each microwire having a metal core of a predetermined material composition, and a glass coating on said metal core, wherein a diameter of the metal core substantially does not exceed 15 μm and a thickness of the glass coating substantially does not exceed 3 μm, and the material composition of the metal core is a soft-magnetic amorphous metal alloy with a Barkhausen effect, a magnetic coercive force of less than 20 A/m, and nearly zero or negative magnetostriction providing a microwire response to an oscillating magnetic field;
   preparing a paper web on top of a fiber mesh, and distributing the microwires in the paper web;

applying water reduction treatment to said paper web, causing a water flow through and out of the paper web, thereby dispersing the microwires and forming a single-layer web structure with the microwires fully embedded therein such that the microwires are arranged with substantially uniform distribution within a plane of the web layer, and quazi-random orientation with about 10 degrees variation of an angle of orientation of the microwires with respect to a longitudinal axis of said web layer.

16. The recording medium according to claim 1, wherein a diameter of the metal core is in a range of 5-15 μm, and a thickness of the insulating layer does not exceed 3 μm.

17. The recording medium of claim 16, wherein the material composition of the metal core is a Co—Fe—Si—B—Cr alloy which contains 67.7% Co, 4.3% Fe, 11% Si, 14% B, and 3% Cr by atomic percentage, and the insulating layer is a glass coating.

* * * * *